(12) United States Patent
Kurokawa (10) Patent No.: US 8,145,220 B2
(45) Date of Patent: Mar. 27, 2012

(54) RADIO COMMUNICATION SYSTEM (75) Inventor: Hideki Kurokawa, Tokyo (JP)

(73) Assignee: NEC Infrontia Corporation, Kanagawa (JP)

(*) Notice: Subject to any disclaimer, the term of this patent is extended or adjusted under 35 U.S.C. 154(b) by 938 days.

(21) Appl. No.: 11/866,773

(22) Filed: Oct. 3, 2007

(65) Prior Publication Data

US 2008/0102839 A1    May 1, 2008

(30) Foreign Application Priority Data

Oct. 30, 2006   (JP) ................................. 2006-294775

(51) Int. Cl.
 *H04W 36/00* (2009.01)
 *H04W 4/00* (2009.01)
(52) U.S. Cl. ........ 455/437; 455/436; 455/438; 455/439; 370/331
(58) Field of Classification Search ....... 455/432.1–453, 455/522, 560–561, 574; 370/331
See application file for complete search history.

(56) References Cited

U.S. PATENT DOCUMENTS

| 7,260,398 B2 * | 8/2007 | Igarashi et al. | 455/436 |
| 2005/0181794 A1 * | 8/2005 | Rajkotia | 455/436 |
| 2006/0281462 A1 * | 12/2006 | Kim et al. | 455/436 |

FOREIGN PATENT DOCUMENTS

| CN | 1720756 B | | 6/2010 |
| JP | 2003-348007 A | | 12/2003 |
| JP | 2004-186953 A | | 7/2004 |
| JP | 2005-94806 A | | 4/2005 |
| JP | 2005094806 | * | 4/2005 |
| KR | 10-2005-0089555 A | | 9/2005 |
| KR | 10-2006-0035200 A | | 4/2006 |

* cited by examiner

*Primary Examiner* — Wesley Kim
(74) *Attorney, Agent, or Firm* — Sughrue Mion, PLLC (57) ABSTRACT

In making a switching by hand-over, it takes a shorter time to redecide a radio base station of destination candidate to be connected that is capable of securing a required radio band, even in case the radio base station of destination to be switched to refuses the connection to a radio communication terminal. Therefore, the radio base station is configured to acquire the service band information of another radio base station, and notify the radio communication terminal of the radio base station information of a destination candidate to be connected to, based on the acquired service band information, in case of refusing a connection switching request from the radio communication terminal performing the hand-over.

14 Claims, 6 Drawing Sheets

| BSSID | RECEIVED RADIO WAVE STRENGTH [dBm] | SN RATIO [dB] | ... |
|---|---|---|---|
| 00:aa:bb:cc:dd:ee | −42 | 30 | ... |
| 00:aa:bb:cc:dd:ff | −60 | 25 | ... |
| 00:aa:bb:dd:cc:cc | −68 | 18 | ... |
| 00:aa:bb:ab:cd:ef | −55 | 35 | ... |
| ⋮ | ⋮ | ⋮ | |

| BSSID | NUMBER OF CONNECTION TERMINALS | ... |
|---|---|---|
| 00: aa: bb: cc: dd: ee | 5 | ... |
| 00: aa: bb: cc: dd: ff | 7 | ... |
| 00: aa: bb: dd: cc: cc | 3 | ... |
| 00: aa: bb: ab: cd: ef | 1 | ... |
| ⋮ | ⋮ | |

F I G. 6

| CODEC | BAND[Kbps] |
|---|---|
| G.711 | 64 |
| G.729 | 8 |
| G.723 | 6.3 |

F I G. 7

| TRANSMISSION RATE [Mbps] | EFFECTIVE RATE [Mbps] |
|---|---|
| 1 | 0.5 |
| 2 | 1 |
| 5.5 | 3 |
| 11 | 6 |

FIG. 9

RADIO COMMUNICATION SYSTEM

This application is based upon and claims the benefit of priority form Japanese patent application No. 2006-294775, filed on Oct. 30, 2006, the disclosure of which is incorporated herein in its entirety by reference.

BACKGROUND OF THE INVENTION

1. Field of the Invention

The present invention pertains to a radio base station, a radio communication system, a communication control method, and a recording medium recording a communication control program, in which a plurality of radio base stations are connected in the system, and a radio communication terminal can switch the radio base stations for connection while moving.

2. Description of Related Art

Generally, in a wireless LAN (Local Area Network) using a wireless transmission medium, a radio communication terminal performs a switching operation (hand-over) for the radio base station to be connected, when a received signal level from the radio base station to the radio communication terminal is deteriorated.

In performing the hand-over, the radio base station of destination to be connected by switching is decided depending on a radio communication signal quality received by the radio communication terminal. The radio communication terminal measures a reception level of report information (beacon) or a data frame from the radio base station being currently connected, and a response confirmation packet to the data frame transmitted from the radio communication terminal, and a ratio of reception level to noise floor (hereinafter, SN ratio: Signal to Noise Ratio), and compares them with preset thresholds.

If the reception level or the SN ratio is below the preset threshold, the radio communication terminal transmits a retrieval packet for retrieving other peripheral radio base stations. And the radio communication terminal receives a retrieval response packet from each radio base station to make a table management, and compares a radio wave communication quality (reception level, SN ratio) from each radio base station. As a result of comparison, the radio communication terminal selects the radio base station having a higher reception level or a SN ratio and makes a connection request. That is, the radio base station only transmits a response packet to the retrieval packet from the radio communication terminal, whereby the radio communication terminal makes a decision for the connection destination based on the management and the comparison results.

As a relevant technique made by the present applicant, there is a system in which the radio base station periodically notifies the wireless resource information of peripheral radio base stations to the radio communication terminal. In this system, the radio communication terminal decides the radio base station of destination to be switched to by hand-over, using the notified wireless resource information, and notifies the decision to the radio base station. And the radio base station receiving a notification requests the radio base station of destination to be switched to, to secure a wireless resource (e.g., refer to patent document 1 (Japanese Patent Application Laid-Open No. 2003-348007).

Also, as a technique related to the present invention, there is a system in which in performing the hand-over, a wireless packet communication apparatus transmits to the radio base station of destination to be switched a request to send communication traffic volume information. In this system, a final judgment for switching over to the radio base station of admissible destination is made, based on the communication traffic volume information from the radio base station of destination to be switched to (e.g., refer to patent document 2 (Japanese Patent Application Laid-Open No. 2004-186953).

Also, as a relevant technique made by the present applicant, there is a system in which a mobile terminal unit transmits to the radio base station a message containing information on a resource amount required for a communication session. In this system, the radio base station transmits to the mobile terminal unit a message containing the radio base station selected as a destination candidate for transfer by hand-over and the information on the communication quality. And the mobile terminal unit receiving the message decides the radio base station of destination to be switched to by hand-over, based on the information of the transmitted message (e.g., refer to patent document 3 (Japanese Patent Application Laid-Open No. 2005-94806).

Next, the problems with those relevant techniques will be described below.

Firstly, in switching the radio base stations by hand-over in the above typical systems, if a situation of the radio base station of destination to be switched to is changed, the radio base station of destination to be switched to may refuse the connection.

If a reconnection request by switching is refused, it is required to retrieve the radio base station of destination to be switched to again, and transmit a connection request again, whereby it takes a lot of time to make the reconnection.

Also, to stabilize the communication, it is required to secure a service band at the radio frequency for use in the radio communication (hereinafter a radio band) in making the reconnection, whereby there is a fear that it possibly takes a lot of time to make the reconnection.

Herein, if the required radio band can not be secured, for example, the communication band required for a voice communication can not be assured, whereby a degradation in a speech communication quality or a disconnection may occur following the hand-over. Also, in a real time communication for a moving picture or the like, a failure such as disordering or freezing of an image may occur.

Also, in the above-cited patent documents 1 to 3, the radio communication terminal decides the radio base station of destination to be switched to by hand-over to have a increased reliability of radio communication. However, it is not considered to shorten a time taken to decide the radio base station of a destination candidate to be connected again when the reconnection request is refused in switching the radio base stations by hand-over.

SUMMARY OF THE INVENTION

An exemplary object of the invention is to provide a radio base station, a radio communication system, a communication control method and a recording medium recording a communication control program, wherein a time taken to redecide the radio base station of destination candidate to be connected that is capable of securing a required radio band can be shortened in switching the radio base stations by hand-over, even in case the radio base station of destination to be switched to refuses the connection to the radio communication terminal, whereby a time required to switch the connection can be shortened, and the radio communication terminal has a higher reliability of radio communication.

A radio base station according to an exemplary aspect of the invention for use in connection with another radio base station comprises a band information acquisition unit that acquires a service band information of another radio base station, and a connection candidate notification unit that notifies a radio communication terminal of the radio base station information of a destination candidate to be connected to, based on the service band information of another radio base station acquired by the band information acquisition unit, in case of refusing a connection switching request from the radio communication terminal performing the hand-over.

A radio base station according to an exemplary aspect of the invention for use in connection with another radio base station, comprises a band information acquisition unit that acquires the service band information of another radio base station, and a connection candidate notification unit that notifies a radio communication terminal of the radio base station information of a destination candidate to be connected to, based on the service band information of another radio base station acquired by the band information acquisition unit, in case of refusing a connection switching request from the radio communication terminal performing the hand-over.

A radio communication system according to an exemplary aspect of the invention comprises a plurality of radio base stations connected by wire or wirelessly.

A communication control method according to an exemplary aspect of the invention in a radio base station for use in connection with another radio base station comprises a band information acquisition step of acquiring the service band information of another radio base station, and a connection candidate notification step of notifying a radio communication terminal of the radio base station information of a destination candidate to be connected to, based on the service band information of another radio base station acquired at the band information acquisition step, in case of refusing a connection switching request from the radio communication terminal performing the hand-over.

A recording medium according to an exemplary aspect of the invention stores a communication control program on a radio base station for use in connection with another radio base station. The program causes the radio base station to perform a band information acquisition step of acquiring the service band information of another radio base station, and a connection candidate notification step of notifying a radio communication terminal of the radio base station information of a destination candidate to be connected to, based on the service band information of another radio base station acquired at the band information acquisition step, in case of refusing a connection switching request from the radio communication terminal performing the hand-over.

BRIEF DESCRIPTION OF THE DRAWINGS

Features of the disclosed embodiments will be described by way of the following detailed description with reference to the accompanying drawings in which:

FIG. 3 is a view showing a configuration example of a peripheral radio base station table 16a;

FIG. 5 is a view showing a configuration example of a radio base station information management table 24a;

DESCRIPTION OF EXEMPLARY EMBODIMENTS

A radio base station, a radio communication system, a communication control method and a communication control program, which are applied to a wireless network system, according to one embodiment of the present invention, will be described below with reference to the drawings.

The wireless network system according to this embodiment is suitable for making a data communication, particularly for making a real time communication of voice and moving picture, in accordance with an Internet Protocol (IP), by connecting to an Internet or Intranet.

Firstly, an outline of the wireless network system according to this embodiment will be described below.

In the wireless network system composed of the radio base stations and the radio communication terminal (wireless mobile terminal) according to this embodiment, the radio communication terminal retrieves the peripheral radio base stations, and notifies the result to the radio base station which is connected before switching. The radio base station has a function of notifying the radio communication terminal of the information on the radio base station of optimal destination to be connected for switching, in consideration of the service band state of the peripheral radio base stations. And the radio communication terminal performs the hand-over in accordance with the notified information of the radio base station to secure the communication quality of destination to be switched to.

Also, when the notified radio base station of destination to be switched to can not be connected due to a change in an environment, the radio communication terminal tries to make the reconnection by retrieving another radio base station. In this case, the radio base station that can not secure the radio band rejects a connection switching request, and notifies the radio communication terminal of the next connection destination, in consideration of the service radio band state of peripheral radio base stations. Thereby, the radio communication terminal is prevented from making further retrieval.

Figure 1:
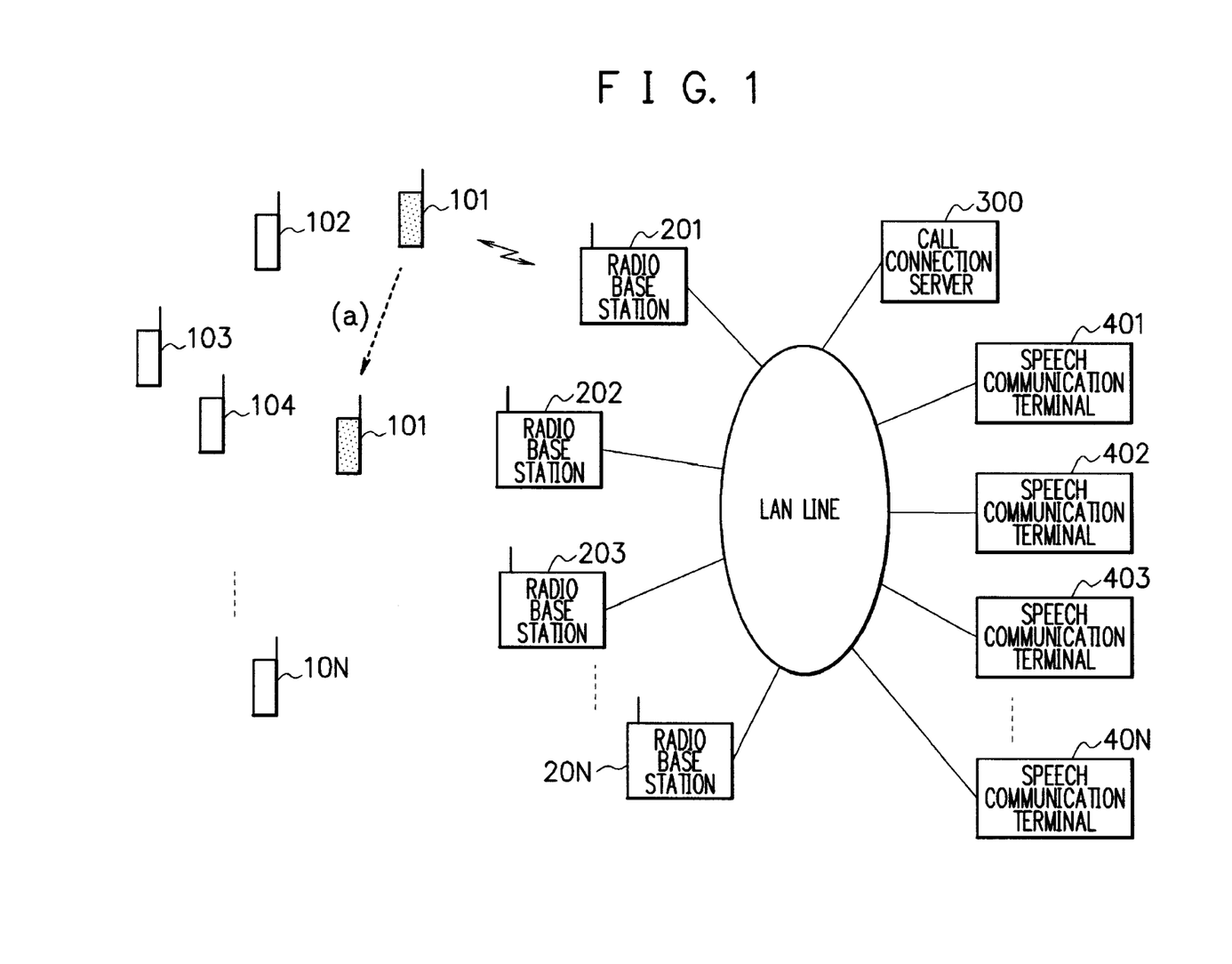
FIG. 1 is a block diagram showing a configuration example of a wireless network system according to an embodiment of the present invention.

Referring to FIG. 1, this embodiment will be described below.

The radio communication terminals 100 (101 to 10N) of this embodiment are connected via a radio medium to the radio base stations 200 (201 to 20N) of this embodiment connected to a LAN line. Thereby, a radio communication terminal 100 can make the communications with a call connection server 300 and the speech communication terminals 400 (401 to 40N) connected to a wire LAN, using the Internet Protocol (IP).

Owing to the function of the radio base station of this embodiment and the function of the radio communication terminal of this embodiment, it is possible to secure the communication quality when the radio communication terminal performs the hand-over. Also, when the communication quality can not be secured, or when the radio base station of destination to be switched to can not continue the communication, a time for retrieving again the radio base station capable of securing the communication quality can be shortened.

Referring to FIG. 1, the configuration of the wireless network system according to this embodiment will be described below in detail.

The wireless network system according to this embodiment comprises a plurality of radio base stations 200 of this embodiment which is connected via the LAN line, as described above. Also, the call connection server 300 and the speech communication terminals 400 are connected via the LAN line, whereby a multi-media wireless network for providing the real time communication of voice and moving picture is constructed.

In FIG. 1, reference numerals 101 to 10N denote the radio communication terminals of this embodiment. Also, in FIG. 1, reference numerals 201 to 20N denote the radio base stations of this embodiment.

The radio communication terminals 101 to 10N can make the communications with the call connection server 300 or the speech communication terminals 401 to 40N connected to the wire LAN via the radio base stations 201 to 20N using the Internet Protocol (IP).

Figure 2:
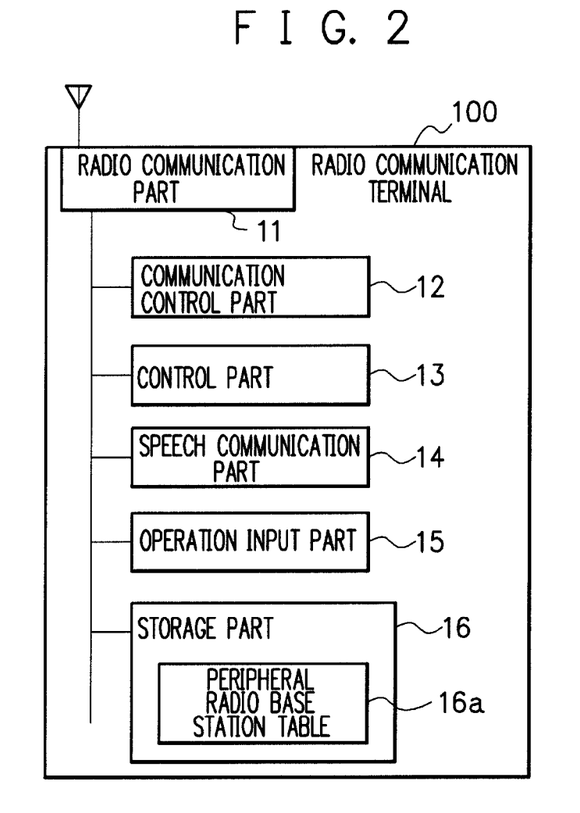
FIG. 2 is a block diagram showing a configuration example of a radio communication terminal 100.

The radio communication terminal 100 comprises a radio communication part 11 for making the radio communication with the radio base station 200, a communication control part 12 for making the communication control such as selecting the radio base station of destination to be connected, a control part 13 for controlling the overall operation of the radio communication terminal 100, a speech communication part 14 for controlling the speech communication via a microphone or a speaker, an operation input part 15 for inputting the information through a user operation, and a storage part 16, as shown in FIG. 2.

The storage part 16 stores a peripheral radio base station table 16a that collects information on each radio base station which can receive a radio wave by the radio communication terminal 100.

Figure 3:
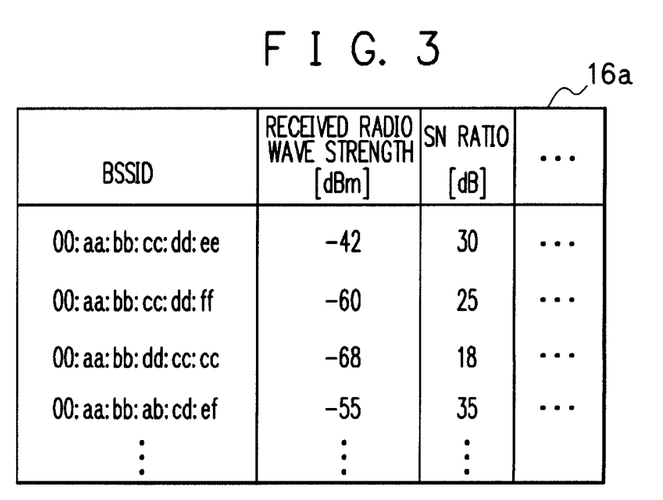

The peripheral radio base station table 16a includes a radio base station specific information for specifying the radio base station such as BSSID (Basic Service Set Identity) associated with a received radio wave strength and an SN ratio (Signal to Noise ratio) of a signal received from the radio base station, as shown in FIG. 3.

Figure 4:
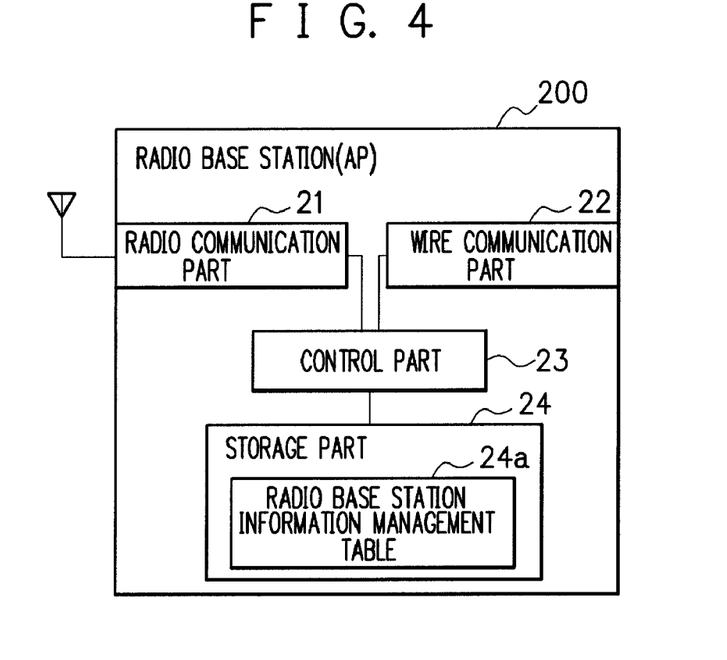
FIG. 4 is a block diagram showing a configuration example of a radio base station 200.

The radio base station 200 comprises a radio communication part 21 for making the radio communication with another apparatus such as the radio communication terminal 100, a wire communication part 22 for making the wire communication with another apparatus such as another radio base station or the call connection server 300, a control part 23 for controlling the overall operation of the radio base station 200, and a storage part 24, as shown in FIG. 4.

The storage part 24 stores a radio base station information management table 24a for managing the information on other radio base stations making up the wireless network system.

Figure 5:
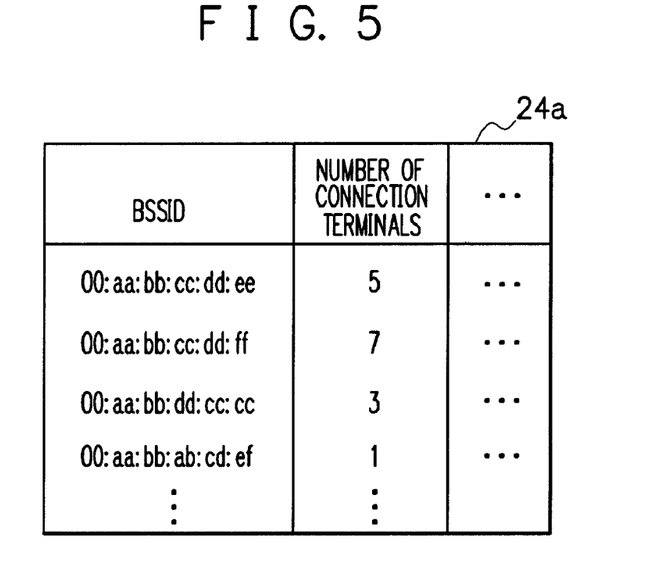

The radio base station information management table 24a stores the radio base station specific information for specifying the radio base station such as BSSID (Basic Service Set Identity) associated with a value (service band information) indicating the radio band used in the radio base station such as the number of connected terminals, shown in FIG. 5.

An example of a method for calculating the radio band used in each radio base station will be described below.

The radio base station always monitors a type of CODEC (COder-DECoder; coding/decoding part) used in each radio communication terminal connected to a self station and a number of terminals connected to the self station.

Figure 6:
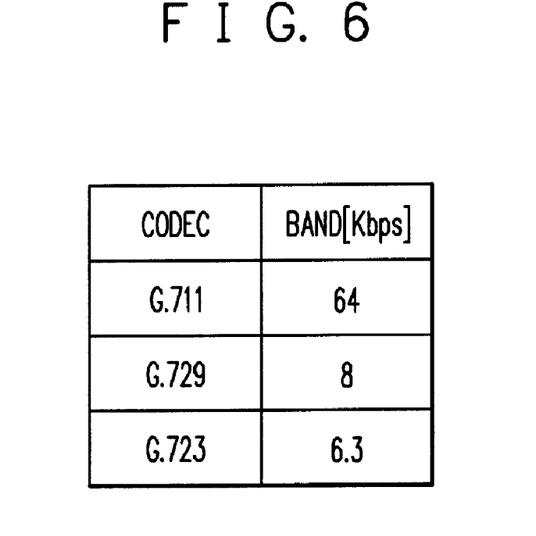
FIG. 6 is a view showing a setting example of the relationship between the type of CODEC and the service band.

A relationship between the type of CODEC and a service band (bit rate; data transmission amount per second) per the radio communication terminal using the CODEC is predetermined as shown in FIG. 6. Therefore, the radio base station can calculate the service band at a point in time from the type of CODEC for the radio communication terminal connected to the self station and the number of radio communication terminals using each CODEC.

Also, when the radio base station supports a plurality of transmission rates, the radio base station can calculate the service band for each transmission rate by monitoring the type of CODEC for the radio communication terminal connected to the self station and the number of radio communication terminals using each CODEC for each transmission rate.

Figure 7:
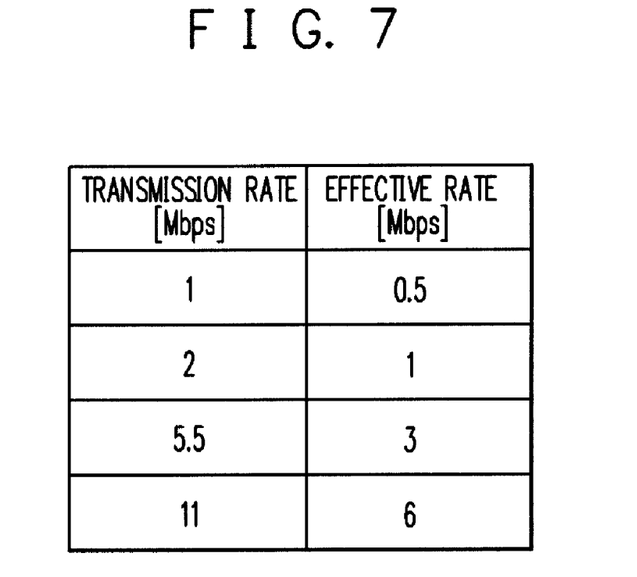
FIG. 7 is a view showing a setting example of an effective rate at each transmission rate.

If an effective rate at each transmission rate is preset as shown in FIG. 7, a remainder of the preset effective rate from which the service band used by the radio communication terminal connected to the radio base station is deducted is estimated as an empty capacity of traffic at the transmission rate.

The radio base station notifies the calculated information to the other communicable radio base stations via the wireless or wire network, if the service band in the self station and the empty capacity of traffic are calculated.

If this notification is received by the radio base station, the information of the service band in each radio base station and the empty capacity of traffic can be mutually shared between the radio base stations.

In the case where the radio base station calculates the radio band using the CODEC as described above, the radio base station information management table 24a may store the number of radio communication terminals using each CODEC as the service band information, for each radio base station, associated with the radio base station specific information of the radio base station.

Also, the information of the empty capacity of traffic may be stored, for each radio base station, associated with the radio base station specific information of the radio base station.

Next, an outline of an operation of the wireless network system according to this embodiment will be described below.

In an example of FIG. 1, it is shown that the radio communication terminal 101 moves in a direction of the arrow of broken line as indicated by (a) during communication with the radio base station 201. That is, when the radio communication terminal 101 moves, the radio wave reception level (received radio wave strength) or the SN ratio from the radio base station 201 falls.

If the radio wave reception level from the radio base station 201 falls below a preset threshold, the radio communication terminal 101 broadcasts a retrieval packet to the peripheral radio base station to retrieve the destination candidate to be connected. The peripheral radio base station receives the retrieval packet, and then transmits to the radio communication terminal of transmission source a retrieval response packet responsive to the retrieval packet.

The radio communication terminal 101 records the reception level and the SN ratio of the received retrieval response packet associated with the radio base station specific information of packet transmission source in the peripheral radio base station table 16a, and transmits the retrieval result information to the radio base station 201 that continues to be connected at present.

The radio base station 201 receiving the retrieval result information transmits to the radio communication terminal 101 a connection destination candidate response, in consideration of the service band information of the peripheral radio base station already acquired through a wire network or wireless line such as a LAN line as shown in FIG. 1.

The radio communication terminal 101 receiving the connection destination candidate response from the radio base station 201 is connected to the connection destination as indicated in the connection destination candidate response and resumes the speech communication.

Figure 8:
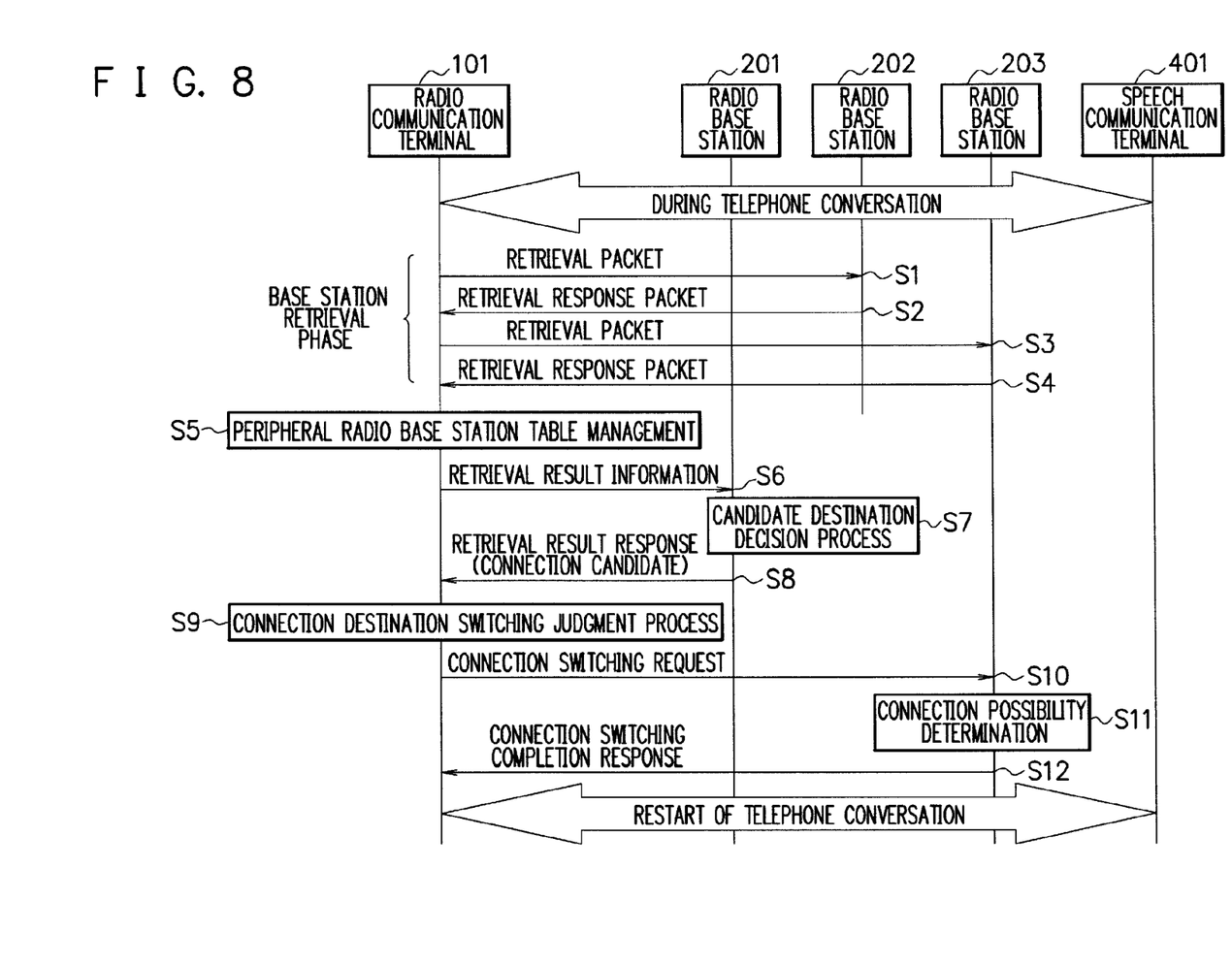
FIG. 8 is a sequence chart showing an operation example in performing the hand-over.

Next, an operation for performing the hand-over between the radio base station 200 and the radio communication terminal 100 according to the embodiment under the environment of including the radio base station connected to many radio communication terminals which has a congested service band and the radio base station without connection to the radio communication terminal which has less congested service band will be described below in detail. FIG. 8 is a sequence chart showing the operation where the radio communication terminal of this embodiment performs the switching (hand-over) of connection with the radio base station.

In an example of FIG. 8, firstly, the radio communication terminal 101 and the speech communication terminal 401 are making the voice communication via the radio base station 201. Herein, if the radio communication terminal 101 moves in a direction of the arrow of broken line as indicated by (a) in FIG. 1, the radio wave reception level from the radio base station falls. If the radio wave reception level falls below a threshold, the radio communication terminal 101 broadcasts a retrieval packet for retrieving the peripheral radio base station to the wireless line (steps S1, S3).

The radio base station 201 and the radio base station 202 receive the retrieval packet from the radio communication terminal 101, and transmit a retrieval response packet (steps S2, S4).

The radio communication terminal 101 receives the retrieval response packet, and records the received radio wave strength and the SN ratio of the received retrieval response packet associated with the radio base station specific information of packet transmission source in the peripheral radio base station table 16a (step S5), and transmits the retrieval result information to the radio base station 201 that continues to be connected at present (step S6).

The radio base station 201 makes the communication with the peripheral radio base stations 202 to 20N through the wire network or wireless network, calculates the service band information of each radio base station in the above-described way and stores the service band information in the radio base station information management table 24a.

Therefore, if receiving the retrieval result information with the received radio wave strength and the SN ratio from the radio communication terminal 101, the radio base station 201 selects the optimal radio base station as the candidate, based on the retrieval result information and the information on the radio band of each radio base station stored in the radio base station information management table 24a (step S7).

At this time, the radio base station 201 decides the optimal radio base station as the destination candidate for the radio communication terminal 101 to make the speech communication by referring to the retrieval result information from the radio communication terminal 101 and the information on the radio band of each radio base station stored in the radio base station information management table 24a, in consideration of a parameter serving as an index of communication quality judgment based on the radio wave reception level and the SN ratio and the information on the band required for the radio communication terminal 101 to continue the voice communication with the speech communication terminal 401.

By deciding the destination candidate in this way, in the operation example as shown in FIG. 8, it is judged that a continued speech communication at the radio base station 203 is appropriate because of the number of radio communication terminals connected and the traffic volume, even if the radio wave reception level and the SN ratio of the radio base station 202 are greater than the radio wave reception level and the SN ratio of the radio base station 203. The radio base station 201 with the radio base station 203 as the connection candidate transmits to the radio communication terminal 101 a retrieval response.

Thus, when the information of connection candidate is received (step S8), the radio communication terminal 101 specifies the radio base station 203 designated from the radio base station 201 as the connection destination to be switched to, and transmits a connection switching request to the radio base station 203 (steps S9, S10).

The radio base station 203 determines that the hand-over can be accepted (step S11), and then transmits a connection switching completion response to the connection switching request received from the radio communication terminal 101 (step S12). Thereby, the radio communication terminal 101 resumes the speech communication with the speech communication terminal 401, and completes the connection destination switching process (hand-over).

Figure 9:
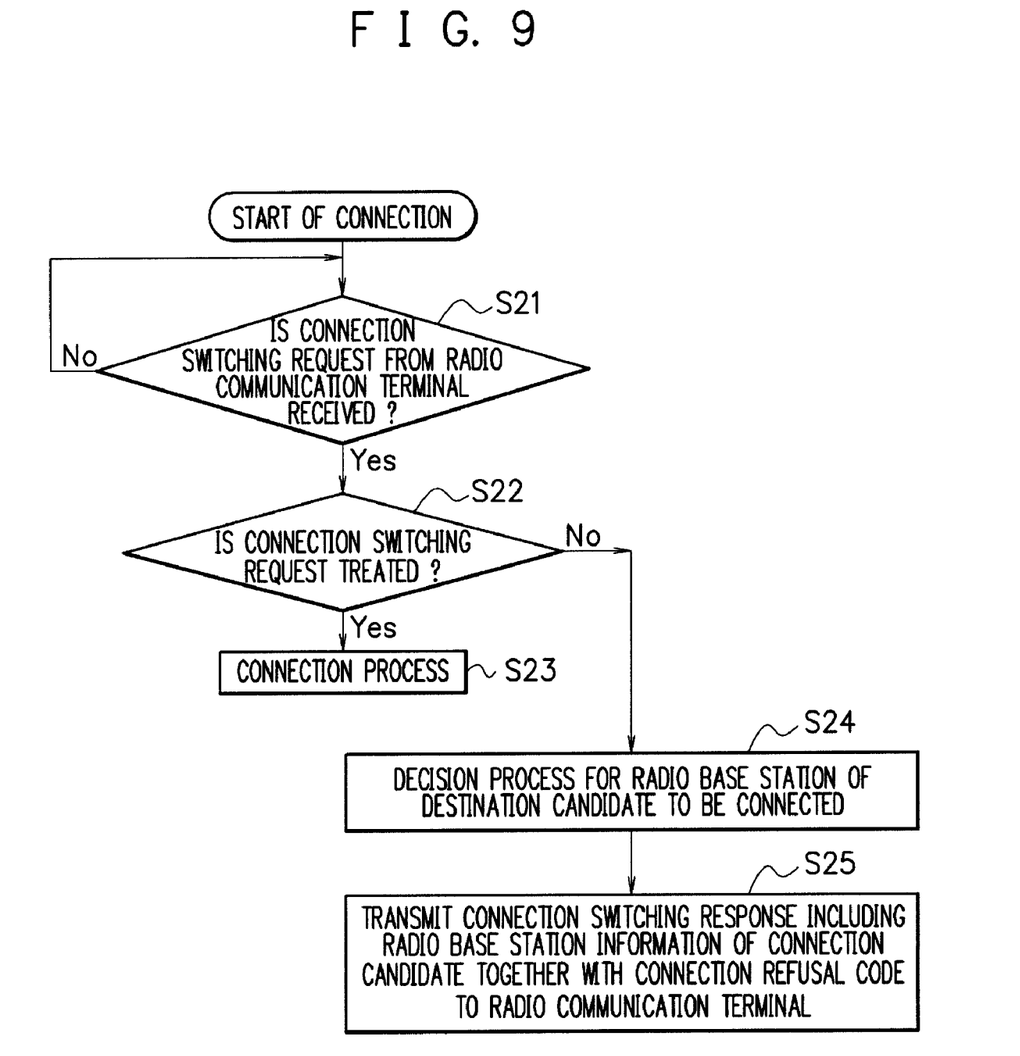
FIG. 9 is a flowchart showing an operation example in refusing a connection switching request.

Referring to FIG. 9, an operation for refusing a connection switching request when the radio base station receives the connection switching request from the radio communication terminal in the operation at step S10 will be described below.

Though there are conceivably various factors as causes of refusing this connection switching request, a failure of the radio base station and an unexpected abrupt increase in the traffic, for example, may be supposed.

When the radio base station 203 receives the connection switching request from the radio communication terminal 101 (step S21) as the operation at step S10 as described above using FIG. 8, the radio base station 203 makes a determination for connection possibility whether the connection switching request can be accepted (step S22).

In this determination for connection possibility, if it is determined that the connection switching request from the radio communication terminal 101 can be accepted (step S22: Yes), such as when the radio base station 203 has an enough margin of the band, the radio base station 203 transmits a connection switching completion response, and performs a process for making the connection to the radio communication terminal 101 (step S23), in the same way as the operation of FIG. 8 as described above.

In making the determination for connection possibility as described above, if the radio base station 203 does not have enough margin of the band to accept the connection request from the radio communication terminal 101, for example, such as when the traffic volume is suddenly increased, the radio base station 203 selects the optimal radio base station as the candidate for the radio communication terminal 101 to make the connection switching, based on the information on the radio band of each radio base station stored in the radio base station information management table 24a of the self station (step S24), in the same way as the operation at step S7 of FIG. 8.

Thus, if the radio base station of destination candidate to be connected is decided, the radio base station 203 stores a code of refusal to a connection switching response to the radio communication terminal 101 and the information on the radio base station of connection candidate, and transmits to the radio communication terminal 101 the connection switching response (step S25).

As described above, with the embodiment of the invention, when the radio communication terminal connected to the radio base station performs the switching (hand-over) between the radio base stations, it is possible to select the radio base station of destination to be switched to, in consideration of the communication quality of the radio base station of destination to be connected. Therefore, the speech communication quality can be secured even after the radio communication terminal switches the radio base stations.

Also, even when the radio base station 203 refuses the connection switching request, the radio communication terminal 101 can omit a radio base station retrieval phase of transmitting a retrieval packet for retrieving the peripheral radio base station and receiving a response packet from the peripheral radio base station by transmitting the radio base station information of connection candidate. Therefore, even if the connection switching request is refused, the time taken to redecide the radio base station of destination candidate to be connected that is capable of securing the required radio band can be shortened, so that the total time required for connection switching can be shortened.

Thereby, even when the hand-over is performed, it is possible to shorten the time required for connection switching, and continuously secure the required radio band.

Also, in the case of the voice communication, for example, the time for retrieving the radio base station of destination to be switched to that is capable of continuously securing the speech communication quality can be shortened, the time required for connection switching can be shortened, and the required radio band can be continuously secured. Therefore, the radio communication terminal can increase a reliability of the wireless voice communication by the radio communication terminals without causing a failure of securing the required communication band, a degraded speech communication quality or a disconnection, following the hand-over.

Also, in the real time communication for moving picture or the like, the time for retrieving the radio base station of destination to be switched to that is capable of securing continuously the communication quality in the real time communication can be shortened, the time required for connection switching can be shortened, and the required radio band can be continuously secured. Therefore, even when the hand-over is performed, it is possible to suppress a failure such as disordering or freezing the video, whereby the radio communication terminal can increase a reliability of the real time communication.

As described above, in making the switching by hand-over, the time taken to redecide the radio base station of destination candidate to be connected that is capable of securing the required radio band can be shortened, even if the radio base station of destination to be switched to refuses the connection to the radio communication terminal. Thereby, the time required for connection switching can be shortened, and the radio communication terminal can increase a reliability of the radio communication.

Though the exemplary embodiments of the invention have been described above, the present invention is not limited to those embodiments, but various variations may be practiced based on the technical ideas of the invention.

For example, the above embodiments have been described in connection with the voice communication, but besides, they may be similarly applied to the data communication and the multi-media communication for moving picture or the like for which the real time property is required.

Though in the above embodiments, the data communication is made using the Internet Protocol (IP) via the wireless LAN, the invention is not limited to this form, as far as the communication is made via the network through the wireless transmission medium, in which a PHS (Personal Handyphone System) network, for example, may be also applicable.

Also, in the above embodiments, the radio communication terminal 101, the radio base station 201, the calling control server 300 and the speech communication terminal 401 may be provided singly or multiply.

If a processing procedure for implementing the wireless network system according to each embodiment is recorded as a program on the recording medium, the program supplied from the recording medium may cause the CPU of a computer constituting the system to execute the functions of each embodiment of the invention.

In this case, even when the information group including the program is supplied from the above recording medium or via the network from the external recording medium to an output device, the invention can be also applied. That is, the program code itself read from the recording medium implements the new functions of the invention, whereby the recording medium storing the program code or the signal read from the recording medium constitutes the invention. This recording medium may be a floppy (registered trademark) disk, a hard disk, an optical disk, an optical magnetic disk, CD-ROM, CD-R, a magnetic tape, a non-volatile memory card, a ROM, or EEPROM, for example.

The program according to the invention enables the functions of the wireless network system according to each embodiment of the invention as described above to be implemented on the wireless network system controlled by the program.

As described above, according to a first aspect of the invention, there is provided a radio base station for use in connection with another radio base station, comprising band information acquisition means for acquiring the service band information of another radio base station, and connection candidate notification means for notifying a radio communication terminal of the radio base station information of a destination candidate to be connected to, based on the service band information of another radio base station acquired by the band information acquisition means, in case of refusing a connection switching request from the radio communication terminal performing the hand-over.

It is preferable that the radio base station further comprises selection means for selecting another connectable radio base station which secures a required band for communication being continued at the radio communication terminal, based on the service band information of another radio base station acquired by the band information acquisition means, wherein the connection candidate notification means notifies the information of the radio base station selected by the selection means to the radio communication terminal in accordance with a connection switching request from the radio communication terminal.

It is preferable that the radio base station further comprises band information storage means for storing the radio base station specific information specifying the radio base station associated with the service band information acquired by the band information acquisition means, wherein the selection means makes the selection based on the service band information of another radio base station stored in the band information storage means.

It is preferable that the radio base station comprises band management means for managing the service band of radio frequency used by the radio base station, and band information sending means for sending the service band information managed by the band management means to another radio base station, wherein the band information acquisition means acquires the information by receiving the service band information from the band information sending means of another radio base station.

Also, according to a second aspect of the invention, there is provided a radio communication system having a plurality of radio base stations according to the first aspect of the invention which is connected by wire or wireless.

Also, according to a third aspect of the invention, there is provided a communication control method in a radio base station for use in connection with another radio base station, comprising a band information acquisition step of acquiring the service band information of another radio base station, and a connection candidate notification step of notifying a radio communication terminal of the radio base station information of a destination candidate to be connected to, based on the service band information of another radio base station acquired at the band information acquisition step, in case of refusing a connection switching request from the radio communication terminal performing the hand-over.

It is preferable that the communication control method further comprises a selection step of selecting another connectable radio base station which secures a required band for communication being continued at the radio communication terminal, based on the service band information of another radio base station acquired at the band information acquisition step, wherein the connection candidate notification step comprises notifying the information of the radio base station selected at the selection step to the radio communication terminal in accordance with a connection switching request from the radio communication terminal.

It is preferable that the communication control method further comprises a band information storage step of storing the radio base station specific information specifying the radio base station associated with the service band information acquired at the band information acquisition step, after the band information acquisition step, wherein the selection step comprises making the selection based on the service band information of another radio base station stored at the band information storage step.

It is preferable that the communication control method further comprises a band management step of managing the service band of radio frequency used by the radio base station, and a band information sending step of enabling the radio base station to send the service band information managed at the band management step to another radio base station, wherein the band information acquisition step comprises acquiring the band information by receiving the service band information sent at the band information sending step.

Also, according to a fourth aspect of the invention, there is provided a communication control program on a radio base station for use in connection with another radio base station, the program causing the radio base station to perform a band information acquisition step of acquiring the service band information of another radio base station, and a connection candidate notification step of notifying a radio communication terminal of the radio base station information of a destination candidate to be connected to, based on the service band information of another radio base station acquired at the band information acquisition step, in case of refusing a connection switching request from the radio communication terminal performing the hand-over.

It is preferable that the communication control program further causes the radio base station to perform a selection step of selecting another connectable radio base station which secures a required band for communication being continued at the radio communication terminal, based on the service band information of another radio base station acquired at the band information acquisition step, wherein the connection candidate notification step comprises notifying the information of the radio base station selected at the selection step to the radio communication terminal in accordance with a connection switching request from the radio communication terminal.

It is preferable that the communication control program further causes the radio base station to perform a band information storage step of storing the radio base station specific information specifying the radio base station associated with the service band information acquired at the band information acquisition step, after the band information acquisition step, wherein the selection step comprises making the selection based on the service band information of another radio base station stored at the band information storage step.

It is preferable that the communication control program further causes the radio base station to perform a band management step of managing the service band of radio frequency used by the radio base station, and a band information sending step of enabling the radio base station to send the service band information managed at the band management step to another radio base station, wherein the band information acquisition step comprises acquiring the information by receiving the service band information sent at the band information sending step.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A radio base station for use in connection with another radio base station, comprising:
   a band information acquisition unit that acquires a service band information of another radio base station; and
   a connection candidate notification unit that, when said radio base station is decided, by a radio base station connected to a radio communication terminal at present, as a candidate for said radio communication terminal performing a hand-over to make connection switching and refuses a connection switching request transmitted from said radio communication terminal performing the hand-over, selects an optimal radio base station as a destination candidate for said radio communication terminal to make connection switching, and notifies said radio communication terminal of a connection switching response including radio base station information of said destination candidate to be connected to and a code of refusal to the connection switching request as a response to the connection switching request, based on the service band information of another radio base station acquired by said band information acquisition unit.

2. The radio base station according to claim 1, further comprising a selection unit that selects another connectable radio base station which secures a required band for communication being continued at said radio communication terminal, based on the service band information of another radio base station acquired by said band information acquisition unit, wherein said connection candidate notification unit notifies the information of the radio base station selected by said selection unit to a radio communication terminal in accordance with a connection switching request from said radio communication terminal.

3. The radio base station according to claim 2, further comprising a band information storage unit that stores the radio base station specific information specifying the radio base station associated with the service band information acquired by said band information acquisition unit, wherein said selection unit makes said selection based on the service band information of another radio base station stored in said band information storage unit.

4. The radio base station according to claim 1, further comprising a band management unit that manages the service band of radio frequency used by said radio base station, and a band information sending unit that sends the service band information managed by said band management unit to another radio base station, wherein said band information acquisition unit acquires the information by receiving the service band information from said band information sending unit of another radio base station.

5. A radio base station for use in connection with another radio base station, comprising:
    band information acquisition means for acquiring a service band information of another radio base station; and
    connection candidate notification means for selecting, when said radio base station is decided, by a radio base station connected to a radio communication terminal at present, as a candidate for said radio communication terminal performing a hand-over to make connection switching and refuses a connection switching request transmitted from said radio communication terminal performing the hand-over, an optical radio base station as a destination candidate for said radio communication terminal to make connection switching, and for notifying said radio communication terminal of a connection switching response including radio base station information of said destination candidate to be connected to and a code of refusal to the connection switching request as a response to the connection switching request, based on the service band information of another radio base station acquired by said band information acquisition means.

6. A radio communication system having a plurality of radio base stations according to claim 1 connected by wire or wirelessly.

7. A communication control method for a radio base station for use in connection with another radio base station, comprising:
    a band information acquisition step of acquiring a service band information of another radio base station; and
    a connection candidate notification step of, when said radio base station is decided, by a radio base station connected to a radio communication terminal at present, as a candidate for said radio communication terminal performing a hand-over to make connection switching and refuses a connection switching request transmitted from said radio communication terminal performing the hand-over, selecting an optimal radio base station as a destination candidate for said radio communication terminal to make connection switching, and of notifying a radio communication terminal of a connection switching response including radio base station information of said destination candidate to be connected to and a code of refusal to the connection switching request as a response to the connection switching request, based on the service band information of another radio base station acquired at said band information acquisition step.

8. The communication control method according to claim 7, further comprising a selection step of selecting another connectable radio base station which secures a required band for communication being continued at said radio communication terminal, based on the service band information of another radio base station acquired at said band information acquisition step, wherein said connection candidate notification step comprises notifying the information of the radio base station selected at said selection step to said radio communication terminal in accordance with a connection switching request from the radio communication terminal.

9. The communication control method according to claim 8, further comprising a band information storage step of storing the radio base station specific information specifying the radio base station associated with the service band information acquired at said band information acquisition step, after said band information acquisition step, wherein said selection step comprises making said selection based on the service band information of another radio base station stored at said band information storage step.

10. The communication control method according to claim 7, further comprising a band management step of managing the service band of radio frequency used by said radio base station, and a band information sending step of enabling said radio base station to send the service band information managed at said band management step to another radio base station, wherein said band information acquisition step comprises acquiring the band information by receiving the service band information sent at said band information sending step.

11. A non-transitory computer readable medium storing a communication control program on a radio base station for use in connection with another radio base station, said program causing said radio base station to perform:
    a band information acquisition step of acquiring service band information of another radio base station; and
    a connection candidate notification step of, when said radio base station is decided, by a radio base station connected to a radio communication terminal at present, as a candidate for said radio communication terminal performing a hand-over to make connection switching and refuses a connection switching request transmitted from said radio communication terminal performing the hand-over, selecting an optimal radio base station as a destination candidate for said radio communication terminal to make connection switching, and of notifying to a radio communication terminal of a connection switching response including radio base station information of said destination candidate to be connected and a code of refusal to the connection switching request as a response to the connection switching request, based on the service band information of another radio base station acquired at said band information acquisition step.

12. The non-transitory computer readable medium according to claim 11, said program further causing said radio base station to perform a selection step of selecting another connectable radio base station which secures a required band for communication being continued at said radio communication terminal, based on the service band information of another radio base station acquired at said band information acquisition step, wherein said connection candidate notification step comprises notifying the information of the radio base station selected at said selection step to said radio communication terminal in accordance with a connection switching request from the radio communication terminal.

13. The non-transitory computer readable medium according to claim 12, said program further causing said radio base station to perform a band information storage step of storing the radio base station specific information specifying the radio base station associated with the service band information acquired at said band information acquisition step, after said band information acquisition step, wherein said selection step comprises making said selection based on the service band information of another radio base station stored at said band information storage step.

14. The non-transitory computer readable medium recording the communication control program according to claim 11, said program further causing said radio base station to perform a band management step of managing the service band of radio frequency used by said radio base station, and a band information sending step of enabling said radio base station to send the service band information managed at said band management step to another radio base station, wherein said band information acquisition step comprises acquiring the information by receiving the service band information sent at said band information sending step.

* * * * *